United States Patent [19]
Righettini et al.

[11] Patent Number: 5,932,638
[45] Date of Patent: Aug. 3, 1999

[54] FREE RADICAL POLYMERIZABLE COMPOSITIONS INCLUDING PARA-HALOGENATED ANILINE DERIVATIVES

[75] Inventors: Robin F. Righettini, Apex, N.C.; Terrence H. Dawdy, Erie, Pa.

[73] Assignee: Lord Corporation, Cary, N.C.

[21] Appl. No.: 08/939,518

[22] Filed: Sep. 29, 1997

Related U.S. Application Data

[63] Continuation of application No. 08/631,930, Apr. 15, 1996, abandoned.

[51] Int. Cl.⁶ .................................................. C08L 67/07
[52] U.S. Cl. ........................ 523/503; 523/500; 523/508; 526/179; 526/201; 526/202; 526/210; 526/211; 526/212; 526/217; 526/220; 526/329.7; 526/335; 526/340; 526/346; 526/347
[58] Field of Search ..................................... 523/500, 503, 523/508; 526/217, 220, 232.1, 329.7, 335, 346

[56] References Cited

U.S. PATENT DOCUMENTS

| | | |
|---|---|---|
| 2,981,650 | 4/1961 | Bäder . |
| 3,321,351 | 5/1967 | Bäder . |
| 4,025,502 | 5/1977 | MacLeay et al. . |
| 4,069,377 | 1/1978 | MacLeay et al. . |
| 4,070,401 | 1/1978 | Hirai et al. . |
| 4,122,056 | 10/1978 | Ramlow et al. . |
| 4,172,098 | 10/1979 | Scheuermann et al. . |
| 4,197,259 | 4/1980 | Guzik . |
| 4,223,115 | 9/1980 | Zalucha et al. . |
| 4,293,665 | 10/1981 | Zalucha et al. . |
| 4,386,194 | 5/1983 | Gruber . |
| 4,404,345 | 9/1983 | Janssen . |
| 4,421,879 | 12/1983 | Eimers et al. . |
| 4,424,331 | 1/1984 | Gruber . |
| 4,452,944 | 6/1984 | Dawdy . |
| 4,467,071 | 8/1984 | Dawdy . |
| 4,760,187 | 7/1988 | Kosak . |
| 4,769,419 | 9/1988 | Dawdy . |
| 4,888,322 | 12/1989 | Saito et al. . |
| 4,933,213 | 6/1990 | Fourquier et al. . |
| 5,089,653 | 2/1992 | Pews et al. . |
| 5,410,085 | 4/1995 | Birkenstock et al. . |

OTHER PUBLICATIONS

O'Driscoll, et al., "Polymerization with Redox Initiators—Substituent Effects in the Initiator System Diethylaniline–Benzoyl Peroxide" 47 Makromol, Chem 15 (1961).

*Primary Examiner*—Fred Zitomer
*Attorney, Agent, or Firm*—Alston & Bird LLP

[57] ABSTRACT

The present invention provides adhesive compositions which include free radical polymerizable compounds and a redox catalyst system to accelerate polymerization thereof. The redox catalyst includes an aniline derivative substituted in the para position by halogen as an accelerator. The use of para-halogenated aniline derivatives as an accelerator in the cure of free radical polymerizable compounds results in good bond strength and greatly improved surface cure of the adhesive composition.

21 Claims, No Drawings

FREE RADICAL POLYMERIZABLE COMPOSITIONS INCLUDING PARA-HALOGENATED ANILINE DERIVATIVES

This application is a continuation of application Ser. No. 08/631,930, filed Apr. 15, 1996 now abandoned.

FIELD OF THE INVENTION

The invention relates generally to polymerizable compositions, and more particularly to free radical polymerizable compositions cured using redox catalysts.

BACKGROUND OF THE INVENTION

Redox catalyst systems are widely used to accelerate polymerization of unsaturated compounds in a variety of applications. Redox catalyst systems generally include an oxidizing agent and a reducing agent (also referred to as accelerators) which are co-reactive at room temperature to generate free radicals to initiate addition polymerization reactions. In an exemplary redox system, the oxidizing agent is an organic peroxide and the reducing agent is a tertiary amine. Exemplary tertiary amines which are commercially available include N,N-diethanol-p-toluidine, N,N-dimethylaniline, and N,N-dimethyl-p-toluidine.

A common problem associated with polymerization of unsaturated compounds, such as acrylic adhesives, is referred to as "air inhibition." Atmospheric oxygen is a powerful inhibitor of free radical reactions. In many applications, it is a practice to use a slight excess of adhesive to ensure complete coverage of the area to be bonded. This can result in some adhesive being squeezed out around the bond area and thus exposed to air, resulting in a layer of unreacted monomer remaining on the surface.

This can be problematic for several reasons. The edge of the bond can be weakened, thus reducing bond strength of the assembly as applied stresses are concentrated at the edges of the bond area. The uncured adhesive surface can also allow free monomer to escape into the atmosphere, contributing to the perceived odor of such adhesives. In addition, an uncured surface can result in adhesive being transferred to other parts of the assembly and increasing clean-up costs. These problems can be aggravated if cure occurs during periods of elevated temperature and/or high relative humidity.

U.S. Pat. No. 3,321,351 teaches the addition of small quantities of waxy materials, such as paraffin, montan wax, beeswax, ceresine wax, spermaceti, and the like, to acrylic based adhesive compositions. The addition of these waxy materials can improve the open time of the adhesives (i.e., the length of time the adhesive can be applied to a surface), as well as provide some improvements in surface cure. Although the use of such waxy materials can provide advantages in surface cure, air inhibition for acrylic adhesives remains a problem.

U.S. Pat. No. 4,421,879 to Eimers, et al. is directed to the use of 3,4-disubstituted aniline as accelerators for curing unsaturated polyester resins used as filling compounds. The aniline is substituted with two radicals $R^3$ and $R^4$, one of which represents C1–C4 alkyl radical or a C5–C6 cycloalkyl radical and the other of which represents a halogen atom. The halogenated aniline accelerators are stated to provide good sandability, long shelf life and prevent discoloration of polyester resins.

SUMMARY OF THE INVENTION

The present invention provides compositions which include at least one free radical polymerizable compound and a redox couple catalyst. The redox catalyst includes at least one oxidizing agent and at least one reducing agent (or accelerator) which are co-reactive with one another to generate free radicals and to initiate and propagate polymerization of the polymerizable compound.

In the invention, p-halogenated aniline derivatives are used as reducing agents to address the problem of air inhibition. The reducing agents of the invention have the following general structure according to Formula (I):

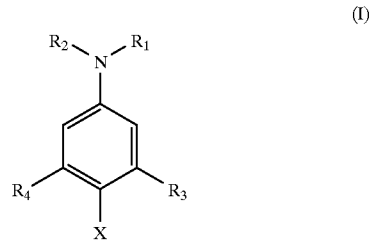

wherein each of $R_1$ and $R_2$ is independently selected from the group consisting of linear or branched, saturated or unsaturated, C1–C10 alkyl and linear or branched, saturated or unsaturated, C1–C10 hydroxyalkyl; each of $R_3$ and $R_4$ is independently selected from the group consisting of hydrogen and C1–C10 alkyl; and X is halogen. Exemplary accelerators in accordance to Formula I include N,N-bis-(β-hydroxyisopropyl)-p-chloroaniline; N,N-(β-hydroxyisopropyl-p-bromoaniline; N,N-bis-(β-hydroxyisopropyl-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

The p-halogenated derivatives of aniline offer several advantages over conventional tertiary amine accelerators. For example, the halogenated compounds can be effective in reducing the air inhibition of the polymerizable compositions even under conditions of high humidity and temperature. This can result in improved surface cure, improved bond strength of the assembly, and can lower the perceived odor of the compositions. In addition, the halogenated compounds can react more slowly than conventional tertiary amines, thus providing better open time for the composition.

The present invention also includes processes for bonding the compositions of the invention to the surface of a substrate.

DETAILED DESCRIPTION OF THE INVENTION

As stated above, the compositions of the present invention include at least one free radical polymerizable compound and a redox couple catalyst. The redox catalyst includes at least one oxidizing agent and at least one reducing agent of Formula (I) above, which are co-reactive with one another to generate free radicals and to initiate and propagate polymerization of the polymerizable compound.

The reducing agents of the present invention have the following Formula (I)

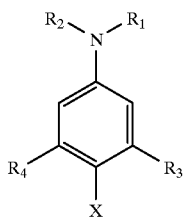

(I)

wherein each of $R_1$ and $R_2$, which may be the same or different, is independently selected from the group consisting of linear or branched, saturated or unsaturated, C1–C10 alkyl and linear or branched, saturated or unsaturated, C1–C10 hydroxyalkyl (i.e., alkyl substituted by —OH);

each of $R_3$ and $R_4$ is independently selected from the group consisting of hydrogen and linear or branched, saturated or unsaturated C1–C10 alkyl; and X is halogen.

In a preferred embodiment of the invention, each of $R_1$ and $R_2$ is independently selected from the group consisting of C1–C4 alkyl and C1–C4 hydroxyalkyl, and more preferably each of $R_1$ and $R_2$ are the same and are methyl or β-hydroxyisopropyl; each of $R_3$ and $R_4$ is hydrogen; and X is fluorine, chlorine, bromine, or iodine, and more preferably chlorine or bromine. Exemplary reducing agents in accordance with the present invention include, but are not limited to, N,N-bis-(β-hydroxyisopropyl)-p-chloroaniline; N,N-(β-hydroxyisopropyl-p-bromoaniline; N,N-bis-(β-hydroxyisopropyl-p-bromo-m-methylaniline; N,N-dimethyl-p-chloroaniline; N,N-dimethyl-p-bromoaniline; N,N-diethyl-p-chloroaniline; and N,N-diethyl-p-bromoaniline. The reducing agents of Formula (I) are typically present in the compositions of the invention in an amount from about 0.05 to about 10, preferably about 0.1 to about 6, weight percent based on the total weight of the composition.

The reducing agents of Formula (I) described above can be used in conjunction with any oxidizing agents known in the art which is useful as a component of a redox catalyst system. Exemplary oxidizing agents which can be used in accordance with the present invention include, but are not limited to, organic peroxides, such as hydrogen peroxide; ketone peroxides, such as acetylacetone peroxide, methylethylketone peroxide, cyclohexanone peroxide and methylisobutylketone peroxide; diacyl peroxides, such as benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; hydroperoxides such as cumene hydroperoxide; peresters, such as tert-butyl peroxide-2-ethyl hexanoate, β-butylperoxybenzoate; perketals, such as 1,1-ditert-butylperoxy-3,3,5-trimethyl cyclohexane; and dialkyl peroxides, such as 1,3-bis(tert-butylperoxyisopropyl) benzene. The diacyl peroxides, and particularly benzoyl peroxide, are preferred initiators. The oxidizing agent can be present in the compositions of the invention in an amount from about 0.5 to about 50 percent by weight, based on the weight of the reducing agent.

The reducing agents of the invention can be included in a variety of free radical polymerizable or curable compositions, such as described in U.S. Pat. Nos. 2,981,650; 3,321,351; 4,223,115; 4,293,665; 4,467,071; 4,452,944; and 4,769,419, the entire disclosure of each of which is hereby incorporated by reference. The compositions of the invention include at least one free radical polymerizable compound. Free radical polymerizable compounds that are useful in the invention include olefinic monomers characterized by the presence of a —C=C— group, for example, an olefinically unsaturated monomer selected from the group consisting of substituted and unsubstituted acrylic acid, and their amides, esters, salts and corresponding nitriles, as well as substituted and unsubstituted styrenes, and the like. Representative monomers include, but are not limited to, methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, 2-ethylhexylmethacrylate, hexyl methacrylate, cyclohexylmethacrylate, lauryl methacrylate, tetrahydrofuryl methacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene, p-tert-butyl styrene, esters of fumaric and maleic acid which are capable of free radical polymerization, and mixtures thereof. Currently preferred monomers include methyl methacrylate and styrene. The compositions of the invention typically include at least one free radical polymerizable compound in an amount from about 10 to about 90, preferably about 20 to about 70, weight percent based on the total weight of the composition.

The compositions of the invention advantageously also include at least one polymeric material which can act as a toughening agent to provide improved impact and shatter resistance to the resultant adhesive and to decrease the brittleness thereof. The polymeric material may or may not include an olefinically unsaturated structure that is capable of being polymerized per se or copolymerized with at least one of the free radical polymerizable monomers described above. The polymeric material can be, for example, Neoprene as described in U.S. Pat. No. 2,981,650, referenced above; a polymer-in-monomer syrup as described in U.S. Pat. Nos. 2,981,650; 3,321,351; and 4,223,115, referenced above (which can also include neoprene); various solid and liquid elastomeric polymeric materials, and in particular liquid olefinic-terminated elastomers (e.g., butadiene-based elastomers and urethane-modified butadiene-based elastomers as described in U.S. Pat. Nos. 4,223,115; 4,452,944; and 4,769,419, referenced above); chlorosulfonated polyethylene rubbers, as described, for example, in U.S. Pat. No. 4,223,115; olefinic urethane reaction products of an isocyanate-functional prepolymer and a hydroxy-functional monomer, as described in U.S. Pat. Nos. 4,223,115; 4,452, 944; 4,467,071; and 4,769,419, referenced above; and the like.

Polymer-in-monomer syrups, compositionally as well as their preparation, are well known in the art. Representative syrups including precursor liquid monomer compounds containing at least one olefinically unsaturated group and their preparation are disclosed in U.S. Pat. Nos. 3,333,025; 3,725, 504; and 3,873,640, the entire disclosure of each of which is hereby incorporated by reference.

Representative liquid olefinic-terminated elastomers include homopolymers of butadiene; copolymers of butadiene and at least one monomer copolymerizable therewith, for example, styrene, acrylonitrile, methacrylonitrile (e.g., poly(butadiene-(meth)acrylonitrile) or poly (butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate, to give, for example, methacrylate-terminated polybutadiene homopolymers and/or copolymers of butadiene).

As described in U.S. Pat. No. 4,769,419, referenced above, the second hydroxyl group of liquid butadiene-based elastomers can be reacted with a isocyanate to form a liquid urethane-modified butadiene elastomer. Representative urethane-modified butadiene-based elastomeric polymeric compounds and processing for preparing the same are described in U.S. Pat. No. 4,769,419.

Such liquid olefinic-terminated elastomers can be present in the compositions of the invention in amounts from about 10 to about 80, preferably about 20 to about 50, weight percent based on the total weight of the composition.

Exemplary chlorosulfonated polyethylene rubbers are described in U.S. Pat. No. 4,223,115 and include chlorosulfonated polyethylene and a mixture of sulfonyl chloride with chlorinated polyethylene. These compositions can have a chlorine content in the range of about 25 to about 67 weight percent and from 3 to about 160 mmols sulfonyl chloride moiety per 100 grams of polymer. Further, the polyethylene from which the chlorosulfonated polyethylene is made preferably has a melt index in the range from about 4 to about 500.

Representative olefinic urethane reaction products of isocyanate-functional prepolymers and hydroxy-functional monomers having at least one unit of polymerizable unsaturation characterized by the presence of at least two units of unsaturation and the substantial absence of free isocyanate groups are also well-known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least two free, unreacted isocyanate groups. Such olefinic urethane reaction products can be present in the compositions of the invention in amounts from 0 to about 40, preferably about 1 to about 25, weight percent based on the total weight of the composition.

Advantageously, the compositions of the present invention also include a phosphorus-containing compound having one or more olefinic group and no less than one P—OH group. Phosphorus-containing compounds, which have been found to enhance metal adhesion, are selected from the group consisting of derivatives of phosphinic acid, phosphonic acid and phosphoric acid having at least one P—OH group and at least one organic moiety characterized by the presence of an olefinic group, which is preferably terminally located. A listing of such phosphorus-containing compounds is found in U.S. Pat. No. 4,223,115, referenced above. Such phosphorus-containing compounds can be present in the compositions of the invention in amounts from about 0.1 to about 20, preferably about 2 to about 10, percent by weight, based on the total weight of the composition.

A preferred group of phosphorus-containing compounds has the formula

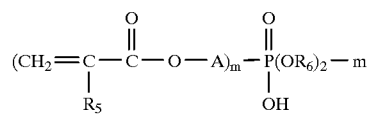

wherein $R_5$ is selected from the group consisting of H, C1 to C8, preferably C1 to C4, alkyl, and $CH_2=CH—$; $R_6$ is selected from the group consisting of H, C1 to C8, preferably C1 to C4, alkyl; A is selected from the group consisting of $—R_7O—$ and $(R_8O)_n$, wherein $R_7$ is an aliphatic or cycloaliphatic C1 to C9, preferably C2 to C6, alkylene group; $R_8$ is C1 to C7, preferably C2 to C4, alkylene group; n is an integer from 2 to 10 and m is 1 or 2, preferably 1.

The compositions of the invention can optionally contain up to about 5 percent by weight based on the total weight of the composition of an unsaturated dicarboxylic acid ester which is not polymerizable by free radical reaction mechanisms, in addition to any of the unsaturated dicarboxylic acid ester free radical polymerizable monomers listed above. Unsaturated dicarboxylic acid esters suitable for use in this regard are preferably alkyl esters with the alkyl moiety having from 1 to 18, preferably 1 to 8, carbon atoms, with fumaric and maleic being especially preferred.

The compositions of the invention can also optionally contain from zero to about 10 percent by weight based on the total weight of the composition of at least one unsaturated polyester resin. Unsaturated polyester resins suitable for use in the adhesive systems described herein are well known in the art. Such resin esters are derived from polycarboxylic acids and polyhydric alcohols, preferably dicarboxylic acids and dihydric alcohols, at least one of the acid and alcohol components being unsaturated. Preferably, the unsaturated polyester resin component will contain a relatively large number of double bonds and be derived from short chain aliphatic polyhydric polyols, such as ethylene glycol and 1,3-propylene glycol, and short chain unsaturated polybasic acids, such as fumaric acid and maleic acid. Such resins can contain quantities of longer chain polyols such as 1,6-hexanediol, as well as higher polybasic acids, such as adipic acid and phthalic acid.

Still further, the compositions of the invention can optionally contain from zero to about 50 percent by weight based on the total weight of the adhesive composition of at least one polyvinyl alkyl ether. Polyvinyl alkyl ethers are well-known in the art. Such ethers will preferably contain 1–8, more preferably 1–4, carbon atoms in the alkyl moiety of the ether. Likewise, styrene-acrylonitrile polymers which are suitable for use in the invention are also well known.

The compositions of the invention can also include up to about 60, preferably not more than about 30, percent by weight based on the total weight of the composition of a polymeric component in addition to the polymeric materials listed above having an intrinsic viscosity of 0.1 to 1.3 that can be obtained by the polymerization of at least one acrylic, styrene, substituted acrylic and non-acrylic olefinic monomers. Exemplary polymeric materials include poly(methyl methacrylate/n-butylacrylate/ethyl acrylate) (90/5/5); poly (n-butyl methacrylate/isobutyl methacrylate) (50/50); poly (n-butyl methacrylate) and poly(ethyl methacrylate).

Epoxy compounds can also be included in the adhesive compositions of the invention in amounts from 0 to about 40, preferably 0 to about 20, weight based on the total weight of the composition. The addition of an epoxy compound can impart heat resistance to the compositions. Epoxy compounds which are suitable for use in the invention are described in U.S. Pat. No. 4,467,071, referenced above, and can be any monomeric or polymeric compound or mixture of compounds having an average of greater than one 1,2-epoxy groups per molecule. The polymeric epoxide compounds can have a number average molecular weight from about 300 to about 10,000. Epoxy compounds are well-known, see for example, U.S. Pat. Nos. 2,467,171; 2,615,007; 2,716,123; 3,030,336 and 3,053,855. Useful epoxy compounds include the polyglycidyl ethers of polyhydric alcohols, such as ethylene glycol, triethylene glycol, 1,2-propylene glycol, 1,5-pentanediol, 1,2,6-hexanetriol, glycerol and 2,2-bis(4-hydroxy-cyclohexyl)propane; the polyglycidyl esters of aliphatic or aromatic polycarboxylic acids, such as oxalic acid, succinic acid, glutaric acid, terephthalic acid, 2,6-naphthalene dicarboxylic acid and dimerized linolenic acid; and the polyglycidyl ethers of polyphenols, such as Bisphenol A, 1,1-bis(4-hydroxyphenyl)ethane, 1,1-bis (hydroxyphenyl)isobutane, 2,2-bis (4-hydroxy-t-butylphenyl)propane, 1,5-dihydroxynaphthalene and novolak resins.

Another optional component is about 0.01 to about 10, preferably about 0.5 to about 5, percent by weight based on the total weight of the composition of tertiary amines having the formula

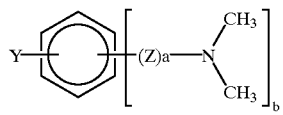

wherein Z is methylene; Y is selected from the group consisting of hydrogen, hydroxy, amino, C1 to C8, preferably C1 to C4, alkyl, and C1 to C8, preferably C1 to C4, alkoxy, a is zero or 1; and b is 1 or 2. This tertiary amine is advantageous in accelerating the cure of such compositions containing the unsaturated organophosphorus compounds described above. Especially preferred tertiary amines are N,N-dimethyl aniline and N,N-dimethylaminomethylphenol.

The environmental resistance of the compositions of the invention can be improved by the optional addition of about 0.005 to about 15, preferably about 0.1 to about 10, percent by weight based on total weight of composition of a mixture of a metal molybdate such as zinc molybdate, calcium molybdate, barium molybdate, strontium molybdate and mixtures thereof, and an inert filler such as zinc phosphate, calcium phosphate, magnesium phosphate, calcium carbonate and mixtures thereof, said metal molybdate being present on a volume concentration basis of from about 0.5 to about 3 parts per part of said inert filler. Such mixtures, including their preparation, are more fully described in U.S. Pat. No. 4,017,315, the disclosure of which is incorporated herein by reference.

The compositions can also optionally include polybasic lead salts of phosphorous acid and saturated and unsaturated organic dicarboxylic acids and acid anhydrides, particularly dibasic lead phthalate, monohydrous tribasic lead maleate, tetrabasic lead fumarate, dibasic lead phosphite and mixtures thereof; and zinc oxide, in an amount of about 0.1 to about 15, preferably about 1 to about 10, percent by weight, based on the total weight of the composition. These compounds can be effective in improving environmental resistance.

Small quantities of various waxy materials as described in U.S. Pat. No. 3,321,351, referenced above, are also advantageously present in the adhesive compositions of the invention. Such materials include, but are not limited to, paraffin, montan wax, beeswax, ceresine wax, spermaceti (natural and synthetic), and the like. The preferred quantity of such waxy materials is about 0.1 to about 3.0 percent by weight based on the total weight of the composition.

The compositions of the invention can also include other additives as known in the art, for example, coloring agents, fillers, pigments such as titanium dioxide and carbon black, extenders such as calcium carbonate, Wollastonite, and talc, viscosity controlling agents, and the like.

A preferred composition of the invention is an ambient temperature-curable adhesive composition that includes:

(a) about 10 to about 90, preferably about 20 to about 70, weight percent of at least one free radical polymerizable monomer as described above;

(b) about 10 to about 80, preferably about 20 to about 50, weight percent of at least one polymeric material as described above;

(c) about 0 to about 20, preferably about 2 to about 10, weight percent of a phosphorus-containing compound having one or more olefinic groups and no less than one P—OH group as described above;

(d) about 0.05 to about 10, preferably about 0.1 to about 6, weight percent of a reducing agent according to Formula (I); and (e) at least one oxidizing agent which is co-reactive with the reducing agent in an amount effective to generate free radicals and to initiate and propagate polymerization of the at least one free radical polymerizable monomer, wherein the weight percents are based on the total weight of components (a)–(e).

The compositions of the invention are normally provided as two-package adhesive systems, with the packages being mixed at the time of use to provide a free radical curable adhesive. Typically the first package includes at least one free radical polymerizable compound and at least one reducing agent.

The second package includes at least one oxidizing agent, and is referred to generally in the art as a bonding accelerator package. The bonding activators which are employed in the adhesive systems of this invention advantageously include (1) from about 0.5 to about 50 percent by weight based on total weight of bonding activator of at least one oxidizing agent as described above; and (2) from about 30 to about 99.5 percent by weight, based on total weight of bonding accelerator, of a carrier vehicle.

The carrier vehicles which are suitable for use in the bonding activators of the present invention can be a simple inert solvent or diluent such as methylene chloride, or butyl benzyl phthalate, including mixtures of such solvents or diluents. The carrier vehicle should contain not more than 5 percent by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the accelerator composition. A particularly preferred carrier vehicle comprising at least one film-forming binder is an admixture comprising from about 0.05 to about 50 percent by weight of (1) at least one saturated organic polymeric film-forming binder having a glass transition temperature in the range from about 0° C. to about 150° C. or (2) at least one polymer-in-monomer syrup as described below; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials which can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl acetals and butyrals, and polycarbonates. The carrier vehicle can contain, in addition to solvent or solvent and film-forming binder, additives such as external plasticizers, flexibilizers, suspenders, and stabilizers, providing that any such additives do not unacceptably adversely affect the stability of the activator compositions.

An exemplary two-package system in accordance with the invention includes:

(I) a first package comprising:
 (a) about 10 to about 90, preferably about 20 to about 70, weight percent of at least one free radical polymerizable monomer as described above;
 (b) about 10 to about 80, preferably about 20 to about 50, weight percent of at least one polymeric material as described above;
 (c) about 0 to about 20, preferably about 2 to about 10, weight percent of a phosphorus-containing compound having one or more olefinic groups and no less than one P—OH group as described above; and
 (d) about 0.05 to about 10, preferably about 0.1 to about 6, weight percent of a reducing agent according to Formula (I) which is co-reactive with an oxidizing agent to produce free radicals which are capable of initiating and propagating free radical polymerization reactions; and (II) a second package comprising:
 a bonding activator containing an oxidizing agent of a redox couple catalyst system, the oxidizing agent being reactive at room temperature with agent (d) when the first and second packages are mixed to produce free radicals which are capable of initiating and propagating free radical polymerizations, the amount of the oxidizing agent being sufficient to interact with agent (d), preferably about 0.5 to about 50 percent by weight of the reducing agent,
 wherein the weight percents are based on the total weight of the first package.

Generally the composition systems include the first and second packages in conventional amounts, for example, in a volume ratio of about 24:1 to about 1:1, preferably about 10:1 to about 1:1, first package:second package ratio. Although the compositions of the invention are normally provided as two-package adhesive systems, the compositions are also useful in other types of systems.

It is necessary that when present epoxy compounds be kept separate from compounds having acidic moieties, such as the unsaturated organophosphorus compound and methacrylic acid to inhibit premature reaction between these components. Thus, in such cases, prior to using the compositions, one pack will contain the unsaturated organophosphorus partial ester and the other pack will contain the epoxy resin. Preferably, the epoxy resin will be incorporated into the bonding accelerator which contains the oxidant of the redox couple catalyst system, with the organophosphorus compound being incorporated into the pack containing the polymerizable adhesive composition. While other multipack systems are available, e.g., the bonding accelerator can contain the reductant of the redox couple catalyst system and the epoxy resin with the oxidant and polymerization inhibitors being incorporated into the pack containing the polymerizable adhesive mass, they are less preferable with respect to shelf stability.

After mixing the individual parts, one or both surfaces to be joined are coated with the mixed adhesive system and the surfaces are placed in contact with each other. The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusive of air and thus cannot be used on surfaces containing air in their pores.

The present invention will be further illustrated by the following non-limiting examples.

EXAMPLE 1

The following composition was prepared in accordance with the invention:

| Component | Weight Percent |
| --- | --- |
| Methacrylated polybutadiene rubber | 35.5 |
| Methyl methacrylate | 34.0 |
| Wollastonite pigment, 325 mesh | 17.5 |
| Fumed Silica, Cabot HS-5 | 4.6 |
| 2-hydroxy-ethyl methacrylate phosphate | 3.0 |
| Methacrylic acid | 2.5 |
| Synthetic Spermecetti Wax | 1.2 |
| N,N-diisopropanol-p-chloroaniline | 1.7 |

The methacrylated polybutadiene rubber is a methacrylate terminated acrylonitrile butadiene rubber as described in U.S. Pat. No. 4,769,419, referenced above, and is added as a toughening agent for the acrylic adhesive to decrease the brittleness thereof. Wollastonite pigment, 325 mesh, available from Nyco Corporation, is a known extender pigment added to provide some degree of structural reinforcement in the adhesive and to lower cost. Fumed silica available from Cabot Corp. as Cabot HS-5 was added as a viscosity control agent. Synthetic spermecetti wax, available from Witco, although not required, is added to also lower air inhibition, as described in U.S. Pat. No. 3,321,351.

This composition was mixed in a 4:1 volume ratio with Accelerator 19, a benzoyl peroxide initiator in carrier commercially available from Lord Corporation. The adhesive was applied to the surface of two 0.063"×1"×4" cold rolled steel coupons (Q-Panel Company, Stock Number RS-14) and the coupons were lapped for a distance of a half inch.

After an overnight cure at room temperature, lap shear tests were performed on the assemblies according to ASTM 1002-94. The lap shear test determines the tension (measured in pounds per square inch, or psi) required to rupture the adhesive bond. Five samples were used, and the results averaged.

The adhesive composition of Example 1 gave a strength of 2400 psi (pounds per square inch) vs. 1610 psi for a control using N,N-diisopropanol-p-toluidine in identical concentration to N,N-diisopropanol-p-chloroaniline.

Both of the adhesive compositions were applied to an aluminum panel in a 50 mil thickness using an eight-path drawdown blade to simulate "squeeze out" of adhesive typically seen in the use of acrylic adhesives in manufacturing applications and to evaluate surface cure of the compositions. The samples were allowed to cure at room temperature for two hours, then scraped with the sharp edge of a wooden tongue blade that was broken in half. The sample cured with N,N-diisopropanol-p-toluidine had an uncured layer of about 25 mils thickness at the surface. The sample cured with N,N-diisopropanol-p-chloroaniline has an uncured layer of 2–3 mils thickness.

EXAMPLE 2

A composition similar to Example 1 was prepared, except using N,N-diisopropanol-p-bromoaniline in place of N,N-diisopropanol-p-chloroaniline. The bond strength and surface cure of this composition was evaluated as described in Example 1. The lap shear strength was 2120 psi, and the sample had an uncured layer of 8–10 mils thickness.

EXAMPLE 3

A composition similar to Example 1 was prepared, except using N,N-diisopropanol-p-bromo-m-methylaniline in place of N,N-diisopropanol-p-chloroaniline. This compositions gave a lap shear strength of 2380 psi, and an uncured layer of 1–2 mils thickness.

EXAMPLE 4

A composition similar to Example 1 was prepared, except using N,N-dimethyl-p-bromoaniline in place of N,N-diisopropanol-p-chloroaniline. This composition gave a lap shear strength of 2480 psi, and an uncured layer of 0–2 mils thickness.

EXAMPLE 5

The composition of Example 1 was applied to a 0.063"× 1"×4" 2024-T3 aluminum coupon (Q Panel Company, stock number AR-14), rather than steel coupons. The bond strength of the structure was evaluated as described above and gave a lap shear strength of 2470 psi.

EXAMPLE 6

A composition similar to Example 1 was prepared, except using 3% N,N-diisopropanol-p-chloroaniline, with the difference made up with less methyl methacrylate. This composition gave a lap shear strength on steel coupons of 2480 psi.

EXAMPLE 7

A composition similar to Example 1 was prepared, except using 0.2% N,N-diisopropanol-p-chloroaniline, with the difference made up with more methyl methacrylate. This composition gave a lap shear strength on steel coupons of 1950 psi.

EXAMPLE 8

A composition similar to Example 1 was prepared, except using N,N-diethyl-p-bromoaniline in place of N,N-diisopropanol-p-chloroaniline. This composition gave a lap shear strength of 2391 psi, and an uncured layer of 35–40 mils thickness. It is believed that the poor surface cure is a result, at least in part, of impurities in the amine, which is supported by theoretical considerations. In the generally accepted mechanism of redox initiation, the tertiary amine is converted to a free radical centered on the alkyl carbon adjacent the nitrogen atom (via the nitrogen centered radial cation). Differences between the radicals generated by various R groups on the nitrogen atom should be relatively minor.

EXAMPLE 9

The following composition was prepared in accordance with the teachings of U.S. Pat. No. 2,981,650, referenced above, by rolling the ingredients overnight in a jar mill, except that N,N-diisopropanol-p-chloroaniline is substituted for N,N-diethanol-p-toluidine:

| Components | Weight Percent |
| --- | --- |
| Polystyrene | 32.1 |
| Styrene | 55.2 |
| Divinyl benzene | 4.0 |
| Dimethyl fumarate | 3.3 |
| Neoprene | 1.7 |
| N,N-diisopropanol-p-chloroaniline | 1.1 |

When drawn onto an aluminum panel, this composition cured to a tack free surface. When five lap shear samples were tested, the average strength was 490 psi. This indicates that these amines are effective in the cure of systems containing monomers other than acrylates.

EXAMPLE 10

Comparative

A composition similar to Example 1 was prepared, except with N,N-dimethyl-m-chloroaniline in place of N,N-diisopropanol-p-chloroaniline. This composition gave a lap shear strength of 2202 psi, and an uncured layer of 35–40 mils thickness.

EXAMPLE 11

Comparative

A composition similar to Example 1 was prepared, except with N,N-diethanol-m-chloroaniline in place of N,N-diisopropanol-p-chloroaniline. This composition gave a lap shear strength of 2075 psi and an uncured layer of 50 mils thickness.

Comparative examples 10 and 11 illustrate that the para-position of the halogen atom of the accelerators of the invention is important to provide good surface cure. When the aniline compounds are substituted at the meta position, the resultant adhesive compositions exhibit poor air inhibition as evidenced by the high level of uncured monomer remaining on the surface (35 to 50 mils thick, as compared to 10 mils, and less, for the accelerators of the present invention).

EXAMPLE 12

Compositions prepared as described in Example 1 above were evaluated with regard to the effect of the amine initiator on salt spray resistance of the resultant acrylic bond, according to ASTM B117-90. The compositions were applied to the surface of two 1"×4" aluminum coupons, and the coupons were lapped for a distance a half inch.

After an overnight cure at room temperature, lap shear tests were performed on the assemblies according to ASTM 1002-94, described above, to determine an initial shear strength and impact strength of the assemblies. Shear strength and impact strength of the assemblies were also evaluated after 6 weeks of exposure to salt spray. Five samples were used, and the results averaged. The results are set forth in Table 1 below.

TABLE 1

Effect of Amine Initiator Type On Salt Spray Resistance of 6061-T6 Aluminum Bonded With An Acrylic Adhesive

| Initial | 2.5% Diispropanol-p Chloroaniline | | 2.5% Diisopropanol-p-Toluidine | |
|---|---|---|---|---|
| | Strength Shear (psi) | Impact Strength (in-lbs.) | Shear Strength (psi) | Impact Strength (in-lbs.) |
| 1 | 2954.0 | 106.4 | 1656.0 | 106.4 |
| 2 | 2686.0 | 106.4 | 1554.0 | 106.4 |
| 3 | 2778.0 | 106.4 | 1710.0 | 106.4 |
| 4 | 2484.0 | 106.4 | 1298.0 | 55.3 |
| 5 | 2560.0 | 106.4 | 1526.0 | 106.4 |
| Mean | 2692.4 | 106.4 | 1548.8 | 96.2 |
| Std. Dev. | 184.9 | 0.0 | 158.8 | 22.9 |
| 6 Wk Salt Spray | | | | |
| 1 | 2146.0 | 106.4 | 1538.0 | 25.5 |
| 2 | 2348.0 | 48.9 | 230.0 | 48.9 |
| 3 | 2726.0 | 106.4 | 1546.0 | 29.9 |
| 4 | 2372.0 | 106.4 | 112.0 | 12.8 |
| 5 | 2614.0 | 106.4 | 172.0 | 12.8 |
| Mean | 2441.2 | 94.9 | 719.6 | 26.0 |
| Std. Dev. | 230.0 | 25.7 | 751.9 | 14.9 |

It is clear that on diisopropanol-p-chloroaniline yields both improved initial bond strength, and improved resistance to salt spray exposure. The improved salt spray resistance is surprising and is believed to result from the decreased water solubility of the diisopropanol-p-chloroaniline relative to that of diisopropanol-p-toluidine. As less material is soluble, less is extracted, and fewer channels are available for the salt water to migrate to the substrate and promote bond failure.

EXAMPLE 13

In an attempt to further evaluate the reduced air inhibition of the adhesive compositions of the invention, 50 mil wet films of each adhesive as prepared in Example 1 above were applied to two 6"×6" aluminum panels. One panel with each adhesive was cured at 72° F. and 33% relative humidity, and the second panel with each adhesive was cured at 100° F. and 100% relative humidity. After 24 hours, the depth of uncured adhesive was estimated by scraping. "diipca" refers to N,N-diisopropanol-p-chloroaniline and "diipt" refers to N,N-diisopropanol-p-toluidine. Results are set forth below in Table 2.

TABLE 2

The Effect of Temperature and Humidity on Air Inhibition

| Amine | 72° F. - 33% RH | 100° F. - 100% RH |
|---|---|---|
| diipt | 2–5 mils | 40–45 mils |
| diipca | 0 | 0-5 mils |

The foregoing examples are illustrative of the present invention and are not to be construed as limiting thereof. The invention is defined by the following claims, with equivalents of the claims to be included therein.

That which is claimed:

1. An adhesive composition comprising:

at least one free radical polymerizable compound selected from the group consisting of substituted and unsubstituted acrylic monomers;

at least one reducing agent having the Formula (I)

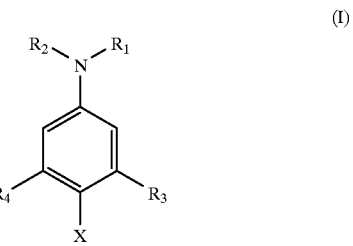

wherein each of $R_1$ and $R_2$ is independently selected from the group consisting of linear or branched, saturated or unsaturated, C1–C10 alkyl and linear or branched, saturated or unsaturated, C1–C10 hydroxyalkyl;

each of $R_3$ and $R_4$ is independently selected from the group consisting of hydrogen and C1–C10 alkyl; and X is halogen; and at least one oxidizing agent which is co-reactive with said reducing agent in an amount effective to generate free radicals and to initiate and propagate polymerization of said at least one free radical polymerizable compound.

2. The composition of claim 1, wherein:

each of $R_1$ and $R_2$ is independently selected from the group consisting of C1–C4 alkyl and C1–C4 hydroxyalkyl;

each of $R_3$ and $R_4$ is hydrogen; and

X is fluorine, chlorine, bromine or iodine.

3. The composition of claim 2, wherein:

each of $R_1$ and $R_2$ is methyl; and

X is chlorine or bromine.

4. The composition of claim 2, wherein:

each of $R_1$ and $R_2$ is βhydroxyisopropyl; and

X is chlorine or bromine.

5. The composition of claim 1, wherein said reducing agent is selected from the group consisting of N,N-bis-(β-hydroxyisopropyl)-p-chloroaniline; N,N-(β-hydroxyisopropyl-p-bromoaniline; N,N-bis-(β-hydroxyisopropyl-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

6. The composition of claim 1, further comprising at least one polymeric material selected from the group consisting of neoprene; a polymer-in-monomer syrup; olefinic terminated elastomeric polymeric materials; chlorosulfonated polyethylene rubbers; and olefinic urethane reaction products of an isocyanate-functional prepolymer and a hydroxy-functional monomer.

7. The composition of claim 1, wherein said at least one oxidizing agent is benzoyl peroxide.

8. The composition of claim 1, further comprising at least one phosphorus-containing compound having at least one olefinically unsaturated group and at least one P—OH group.

9. A composition comprising:
at least one free radical polymerizable monomer;
at least one polymeric material selected from the group consisting of neoprene; a polymer-in-monomer syrup; olefinic terminated elastomeric polymeric materials; chlorosulfonated polyethylene rubbers; and olefinic urethane reaction products of an isocyanate-functional prepolymer and a hydroxy-functional monomer;
at least one reducing agent having the Formula (I)

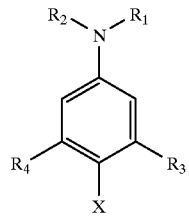
(I)

wherein each of $R_1$ and $R_2$ is independently selected from the group consisting of linear or branched, saturated or unsaturated, C1–C4 alkyl and linear or branched, saturated or unsaturated, C1–C4 hydroxyalkyl;
each of $R_3$ and $R_4$ is hydrogen; and
X is chlorine or bromine; and
at least one oxidizing agent which is co-reactive with said reducing agent, said at least one oxidizing agent present in an amount effective to generate free radicals and to initiate and propagate polymerization of said at least one polymerizable monomer.

10. The composition of claim 9, wherein each of $R_1$ and $R_2$ is methyl.

11. The composition of claim 9, wherein each of $R_1$ and $R_2$ is β-hydroxyisopropyl.

12. The composition of claim 9, wherein said reducing agent is selected from the group consisting of N,N-bis-(β-hydroxyisopropyl)-p-chloroaniline; N,N-(β-hydroxyisopropyl-p-bromoaniline; N,N-bis-(β-hydroxyisopropyl-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

13. The composition of claim 9, wherein said at least one olefinic monomer is methyl methacrylate; and wherein said at least one polymeric material is at least one olefinic terminated elastomer.

14. The composition of claim 13, wherein said at least one olefinic terminated elastomer is a liquid butadiene-based elastomeric polymeric material.

15. The composition of claim 14, wherein said a liquid butadiene-based elastomeric polymeric material is a liquid urethane-modified butadiene elastomer.

16. The composition of claim 9, wherein said at least one olefinic monomer is styrene; and said at least one polymeric material is a mixture of styrene monomer with polystyrene.

17. The composition of claim 10, further comprising at least one phosphorus-containing compound having at least one olefinically unsaturated group and at least one P—OH group.

18. An ambient temperature-curable adhesive composition comprising:
(a) about 10 to about 90 weight percent of at least one free radical polymerizable monomer;
(b) about 10 to about 80 weight percent of at least one polymeric material;
(c) about 0 to about 20 weight percent of a phosphorus-containing compound having one or more olefinic groups and no less than one P—OH group;
(d) about 0.05 to about 10 weight percent of a reducing agent according to Formula (I);

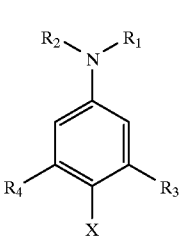
(I)

wherein each of $R_1$ and $R_2$ is independently selected from the group consisting of linear or branched, saturated or unsaturated, C1–C4 alkyl and linear or branched, saturated or unsaturated, C1–C4 hydroxyalkyl;
each of $R_3$ and $R_4$ is hydrogen; and
X is chlorine or bromine; and
(e) at least one oxidizing agent which is co-reactive with said reducing agent in an amount effective to generate free radicals and to initiate and propagate polymerization of said at least one free radical polymerizable monomer,
wherein the weight percents are based on the total weight of components (a)–(e).

19. A multipack adhesive comprising a first and second package adhesive system, said packages being mixed at the time of use to provide a free radical curable adhesive,
the first package comprising:
a composition comprising at least one free radical polymerizable compound; and at least one reducing agent having the Formula (I)

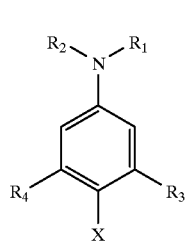
(I)

wherein each of $R_1$ and $R_2$ is independently selected from the group consisting of linear or branched, saturated or unsaturated, C1–C10 alkyl and linear or branched, saturated or unsaturated, C1–C10 hydroxyalkyl;
each of $R_3$ and $R_4$ is independently selected from the group consisting of hydrogen and C1–C10 alkyl; and
X is halogen; and
the second package comprising a bonding accelerator comprising at least one oxidizing agent which is co-reactive with said reducing agent when said first and second packages are mixed, said at least one oxidizing agent present in said second package in an amount effective to generate free radicals and to initiate and propagate polymerization of said at least one free radical polymerizable compound.

20. A process for bonding an adhesive composition to the surface of a substrate, comprising:

applying a composition to a surface of a substrate, said composition comprising at least one free radical polymerizable compound; at least one reducing agent having the Formula (I)

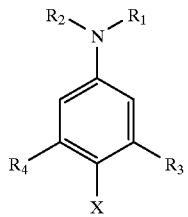
(I)

wherein each of $R_1$ and $R_2$ is independently selected from the group consisting of linear or branched, saturated or unsaturated, C1–C10 alkyl and linear or branched, saturated or unsaturated, C1–C10 hydroxyalkyl; each of $R_3$ and $R_4$ is independently selected from the group consisting of hydrogen and C1–C10 alkyl; and X is halogen; and at least one oxidizing agent which is co-reactive with said reducing agent in an amount effective to generate free radicals and to initiate and propagate polymerization of said at least one free radical polymerizable compound; and subjecting said composition to conditions sufficient to cure said free racial polymerizable compound and to bond the composition to said substrate surface.

21. The process of claim 20, further comprising the step of contacting the surface of said substrate with a surface of a second substrate after said applying step.

* * * * *